Oct. 8, 1968

L. C. REYNOLDS ETAL

LAMINATED BREATHABLE TEXTILE PRODUCT AND METHOD OF MANUFACTURING SAME

Re. 26,473

Original Filed Aug. 17, 1961

2 Sheets-Sheet 1

INVENTORS
LINTON C. REYNOLDS &
JULIAN W. SHIRLEY, DECEASED
BY NANCY A. SHIRLEY, ADMINISTRATRIX

BY Warley L. Parrott
ATTORNEY

INVENTORS
LINTON C. REYNOLDS &
JULIAN W. SHIRLEY, DECEASED
BY NANCY A. SHIRLEY, ADMINISTRATRIX
BY Warley L. Parrott
ATTORNEY United States Patent Office Re. 26,473
Reissued Oct. 8, 1968

26,473

LAMINATED BREATHABLE TEXTILE PRODUCT AND METHOD OF MANUFACTURING SAME

Linton C. Reynolds, Ware Shoals, S.C., and Julian W. Shirley, deceased, late of Ware Shoals, S.C., by Nancy A. Hannah, administratrix, Abbeville, S.C., assignors to Riegel Textile Corporation, a corporation of Delaware Original No. 3,251,727, dated May 17, 1966, Ser. No. 132,241, Aug. 17, 1961. Application for reissue Nov. 25, 1966, Ser. No. 607,336
3 Claims. (Cl. 161—148)

Matter enclosed in heavy brackets [ ] appears in the original patent but forms no part of this reissue specification; matter printed in italics indicates the additions made by reissue.

*ABSTRACT OF THE DISCLOSURE*

*A laminated, air permeable, breathable, flexible, textile fabric and the method of manufacturing same, which is suitable for use in garments. The fabric comprises at least two layers of fabric bonded together by a discontinuous, thixotropic, thermoactive resinous layer of small, spaced, non-contacting, raised deposits disposed in a uniform pattern of dots that do not cover more than about one-fourth of the surface area of the fabric. The deposits penetrate the fabric layers and strongly bond them together at the locations of the spaced deposits without substantially changing the breathability and other characteristics of the fabric layers.*

The present invention is directed to a textile laminated product and method of manufacturing same, and more particularly to an air permeable (breathable) laminated sheet formed from two or more layers bonded together by spaced deposits of bonding material between layers.

The bonding with spaced deposits of bonding material according to the present invention produces a laminated product having breathability, flexibility and other characteristics substantially similar to the characteristics of the individual layers of the laminated product without substantial modification of these characteristics by the spaced deposits of bonding material. Thus, by the present invention, it is possible to produce a laminated product having, for example, the breathability, flexibility, and other characteristics not normally obtainable in a conventional laminated textile product, in which a continuous coating of bonding material is used between layers and in which the coating substantially restricts breathability and may eliminate breathability completely, and undesirably modifies other characteristics of the layers.

Breathability and flexibility are important characteristics of textile fabrics, especially in the garment field, and prior attempts to laminate woven or knitted fabrics as such, or with foamated plastics, to obtain a product having insulating properties, or other desired properties, have not been successful in obtaining in the laminated product the breathability of the layer or layers. The continuous layer of bonding material tends to render the laminated product impermeable to air and also to stiffen the material. The prior attempts to laminate textile fabrics with foamated layers involved either applying a continuous coating of adhesive as such, betwen the layers, or heating of the foam to the softening point so that the surface thereof would fuse to form a substantially continuous adhesive coat to effect a bond with the fabric. Both of these procedures substantially restricted breathability of the product. Also, the procedure of heating the foam to form an adhesive coating resulted in a loss in thickness of the foam of about one third, e.g. reduction in thickness from 3/32" to 1/16". The procedure of the present invention does not adversely affect breathability and does not cause any loss in thickness of the foam.

Another important feature of the present invention is the strong bonding that is obtained by the spaced deposits of bonding material preferably in raised form. These deposits effect secure contact between the bonding material and the adjacent laminated textile sheets, such as woven or knitted fabrics and foamated plastic materials. The raised spaced deposits of bonding material readily extend into the interstices of the fabric and foam to provide a strong adherence between the layers and the spaced deposits.

In addition, the use of spaced deposits substantially reduces the amount of material necessary to obtain satisfactory lamination, as compared with a continuous coating.

In one preferred embodiment of the present invention a thixotropic thermoactive bonding material is used to laminate a sheet of textile fabric with a sheet of foamed plastic material. The thixotropic material is applied in spaced deposits to one of the sheets in a flowable condition so that it enters the pores of the sheet, and yet sets up on the surface in a raised form and effects secure contact with the other sheet, when subjected to a curing heat.

Items of wearing apparel such as jackets and other garments, wherein warmth is a desired characteristic, may be produced with this combination of fabric and a foamated plastic material, such as polyurethane foam. This laminated product has the thermal insulating characteristics of the foam and has the surface characteristics and other desirable properties of the fabric layer. In this manner a jacket or similar garment can be produced having the same warmth as prior garments many times heavier and more cumbersome. If desired, fabric layers can be laminated to both sides of the foam layer to conceal completely the foam and obtain fabric surfaces on both sides of the laminated product.

Other and further features and advantages of the present invention will be apparent from the following description and drawings, in which.

Figure 1:
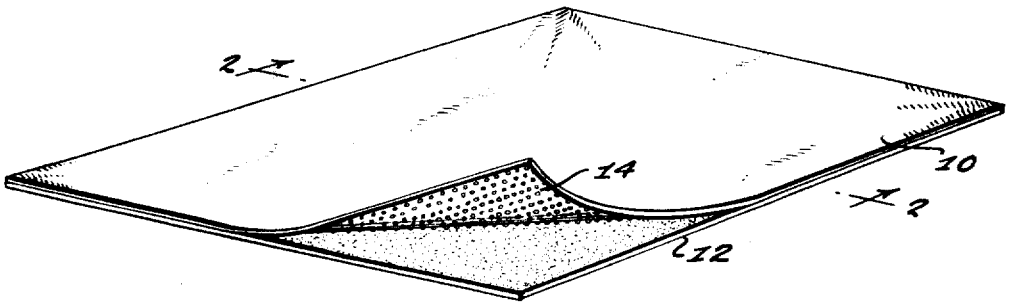
FIG. 1 is a perspective view of a breathable laminated textile fabric-foam product of the present invention showing one corner of the woven fabric layer turned up to illustrate the spaced deposits of bonding material.
Figure 2:
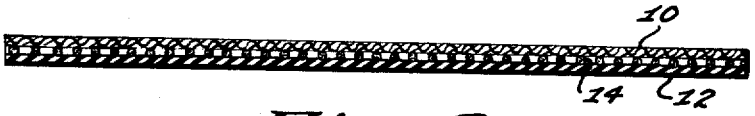
FIG. 2 is a vertical sectional view of the laminated product of FIG. 1 taken along line 2—2 of FIG. 1.

The preferred embodiment of the present invention illustrated in FIGS. 1 and 2 of the drawings, comprises a top layer 10 of woven fabric and a bottom layer 12 of a commercial foamated polyurethane. The fabric layer 10 and the foam layer 12 are bonded together by the spaced deposits 14 of bonding material.

As indicated in FIG. 2 the spaced deposits 14 are somewhat raised and extend from and within the surface of the fabric 10 to and within the surface of the foam 12. These deposits 14 actually enter into the interstices of the fabric and foam layers to provide a strong bond. As these deposits 14 are spaced apart and do not form a continuous surface between the layers 10 and 12, they do not substantially modify the characteristics of the layers themselves and particularly do not substantially reduce the breathability of the layers.

The preferred form of bonding material is a thixotropic thermoactive resinous adhesive. Being thixotropic the material can be made to flow into the interstices of the layer on which it is applied and yet will stand up sufficiently on the surface so that when the other layer is placed in contact the deposits will flow into the openings or pores of the other layer. Upon subsequent drying and curing, by heating, the bonding material adheres to the two layers to provide a strong bond between the layers at the locations of the spaced deposits.

Figure 5:
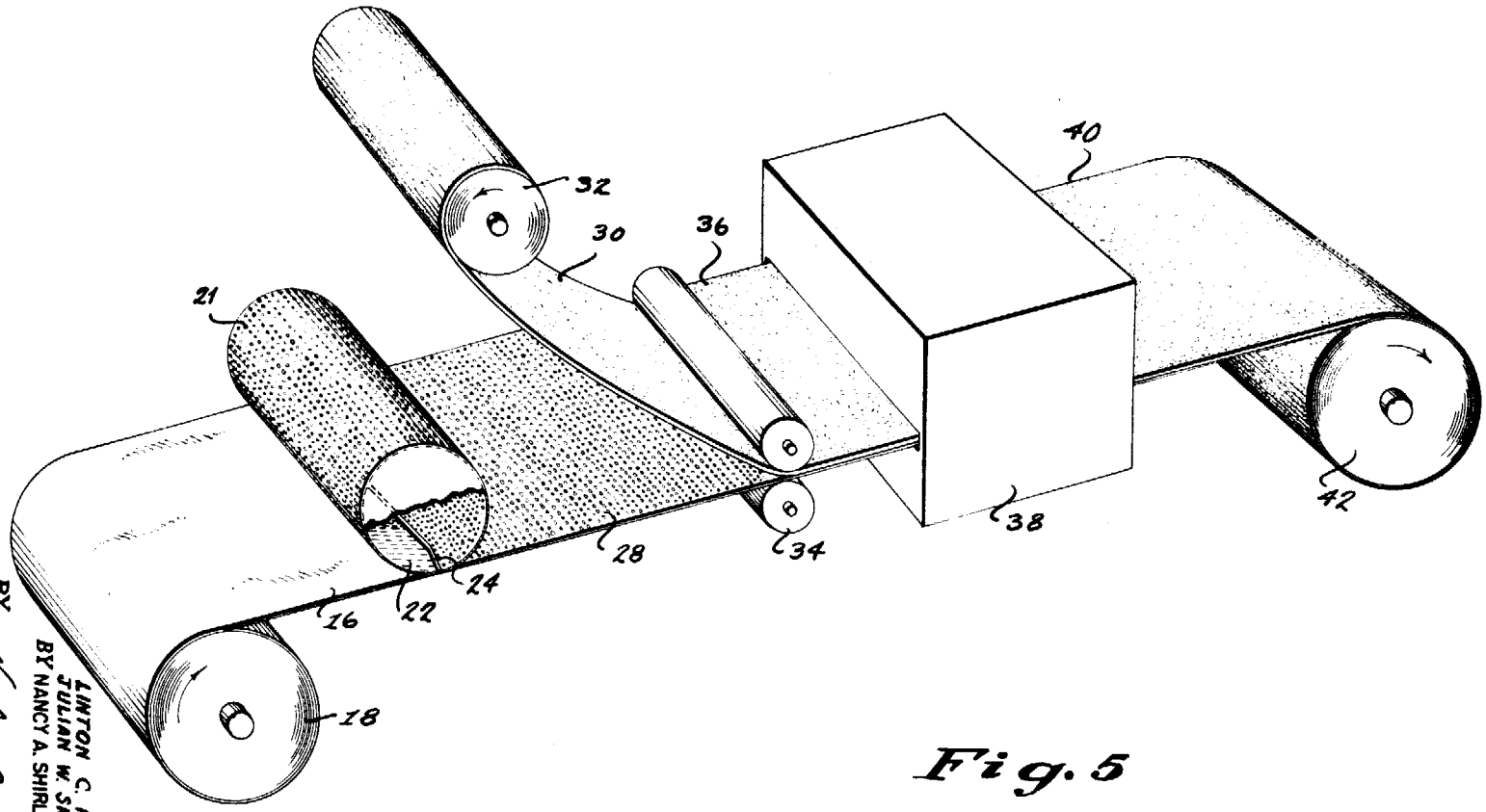
FIG. 5 is a diagrammatic perspective view of a system for laminating the products of this invention.

A suitable arrangement for manufacturing the breathable textile product of this invention is illustrated diagrammatically in FIG. 5. In this system the sheet 16 of woven cotton fabric is withdrawn from a supply roll 18 and drawn under a rotating screen 20 in which a supply of bonding material 22 is contained behind a stationary doctor blade. This screening mechanism is of the type disclosed and claimed in our U.S. Patent No. 2,893,315, issued July 7, 1959.

As the screen 21 rotates the material 22 is forced by the doctor blade through the screen perforations 24 onto the fabric sheet 16 into which the deposits partially penetrate and leave some of the material in the form of raised deposits on the fabric.

As the sheet 16 with the deposits 28 thereon progress a sheet 30 of foamated polyurethane plastic material is withdraw from a supply roll 32 and brought down into contact with the deposits 28 on the fabric sheet 16. A pair of pressure rolls 34 press the sheets 30 and 16 together with the deposits 28 therebetween to press the layers in firm contact with the deposits 28 and insure secure engagement of the deposits 28 in and upon the two layers.

The composite laminated sheet 36 passes from the pressure rolls 34 through the oven 38 wherein the sheet 36 is subjected to sufficient heat to dry and cure the deposits 28 and thereby bond the sheets 30 and 16 together to form the completed laminated sheet 40 which is then wound on a take up roll 42 for storage or shipment.

In one commercial form of the preferred embodiment of the present invention the fabric layer is a woven cotton fabric, and the foam layer is a commercial polyurethane foam of 3/32 inch thickness. The deposits 14 of bonding material are approximately 0.045" in diameter. These deposits are arranged in a pattern with a spacing of approximately 0.048" between the dots, which provides a coverage of approximately one quarter of the surface area of the fabric.

Excellent results have been obtained with a bonding material of the following formulation:

| | Parts |
|---|---|
| Rhoplex B-15 as disclosed in U.S. Patent No. 2,795,564—46% aqueous dispersion of a non-ionic, soft, film-forming acrylic polymer latex, formed from 92.5% ethyl acrylate, 5% methyl methacrylate and 2.5% acrylic acid, all parts by weight | 90 |
| Rhonite 401 as disclosed in U.S. Patent No. 2,915,487—butylated methanol melamine resin | 10 |
| Ammonia 28% $NH_4OH$ | 1 |

The Rhonite 401 and Rhoplex B-15 are products of the Rohm & Haas Company.

The ammonia in the above formulation is included for the purpose of raising the pH of the formulation to 8 or 9, to control the viscosity of the mixture. The amount of ammonia can be varied to obtain desired results.

When using the above formulation in the method illustrated in FIG. 5, optimum drying and curing is obtained in the oven 38 with an oven temperature of 450° F. with the speed of the sheet adjusted so that it takes approximately one minute to travel through the drying and curing oven. The oven temperature and speed of the sheet can be varied to adapt the process to different materials and equipment.

The resulting laminated product has very strong bonding characteristics even when washed or dry cleaned and the tensile strength and abrasion of the fabric layer is increased substantially by the lamination. In addition ironing (at 410° F.) and steam pressing have no apparent adverse effect on the laminate using the above formulation. Further, accelerated light tests did not affect the bond or cause the adhesive to show through either the cloth or foam.

Although one specific formulation for the bonding material is set out above, it should be understood that various other formulations could produce acceptable results and the present invention is not intended to be limited specifically to the above formulation or to the specific size and configuration of the deposits 14 illustrated in FIGS. 1 and 2. Suitable results are obtainable using deposits in the form of spaced raised stripes, or the like.

Figure 3:
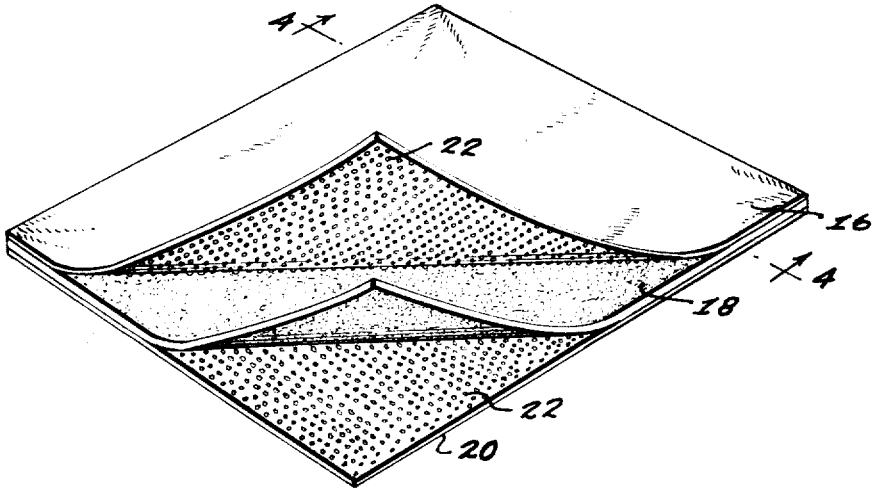
FIG. 3 is a perspective view similar to FIG. 1 and showing another embodiment of the flexible laminated product of the present invention in which the foam material is enclosed between two fabric sheets, and showing the top fabric sheet and foam sheet turned up at one corner to illustrate the spaced deposits of bonding material.
Figure 4:
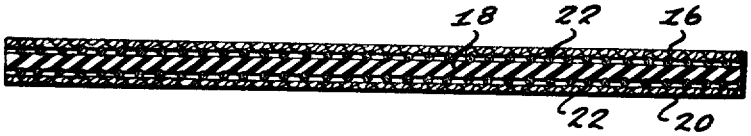
FIG. 4 is a vertical sectional view of the laminated product of FIG. 3 taken along line 4—4 of FIG. 3.

A variation of the combination illustrated in FIGS. 1 and 2 and described above is shown in FIGS. 3 and 4. This variation is a three-ply rather than a two-ply construction with a top layer 16 of textile fabric material, an intermediate layer 18 of foamated polyurethane and a bottom covering layer 20 of textile fabric material. The layers are joined together by deposits 22 of the same material applied in the same manner as the deposits 14 in FIGS. 1 and 2. This construction of FIGS. 3 and 4 can be manufactured in a two step operation utilizing the method illustrated in FIG. 5 and described above. In the first step the top layer 16 and intermediate layer 18 are laminated together and in the second step the bottom layer 20 is laminated to the other layers by applying the deposits 22 to the top surface of the bottom layer 20 and bringing the foam layer 18 of the previously formed laminate into contact with the bottom layer 20 and deposits 22 using the same method illustrated in FIG. 5 and described above.

The term "textile" as used in the specification and claims herein is used in a generic sense to include woven textile fabrics, knitted textile fabrics, non-woven textile fabrics and also the foamated sheet or layer described herein for bonding with one or more layers of the other textile materials.

The present invention has been described in detail above for purposes of illustration only and is not intended to be limited by this description or otherwise except as defined in the appended claims.

What is claimed is:

1. A laminated, air permeable, breathable, flexible, textile fabric suitable for use in garments, comprising at least two layers of fabric bonded together by a discontinuous *thixotropic* [thioxotropic], thermoactive resinous layer of small, spaced, non-contacting raised deposits disposed in a uniform pattern of dots and that do not cover more than about one-fourth of the surface area of the fabric, said deposits penetrating the fabric layers and strongly bonding them together at the locations of the spaced deposits without substantialy changing the breathability and other characteristics of the fabric layer, said bonding deposits being comprised of a mixture of acrylic polymer latex resin and butylated methanol melamine resin to form a substantialy thermosetting composition which may be subjected to high degrees of temperatures during normal cleaning processes while retaining the bond between said fabric layers.

2. A method of manufacturing a breathable laminated textile product comprising applying a uniform pattern of spaced non-contacting, raised deposits of a thixotropic, thermoactive, resinous bonding material, comprised of a preponderant amount of acrylic polymer latex resin and a minor amount of butylated methanol melamine resin to form a substantially thermosetting composition which may be subjected to high degrees of temperature during normal cleaning processes while retaining the bonding characteristics, on not more than one-fourth of the surface area of the fabric so that a majority of the surface area is not covered by the bonding material, placing another layer of breathable textile sheet material in contact with said raised deposits, heating to effect drying and curing of the deposits of bonding material, and causing the spaced deposits to adhere to both layers to bond the layers together.

*3. A laminated, air-permeable, breathable, flexible, textile fabric suitable for use in garments comprising at least two layers of fabric bonded together by a multiplicity of small, spaced, non-contacting, thermoactive, thixotropic resinous deposits disposed in a uniform patterned arrangement, said deposits partially penetrating the fabric layers and strongly bonding them together at the locations of the spaced deposits without substantially changing the breathability and other characteristics of the fabric layers, and said deposits forming a substantially thermosetting composition of such a nature as to maintain the bond between said fabric layers when subjected to temperatures as high as 400° F. or higher during normal cleaning, ironing and steam pressing processes.*

References Cited

The following references, cited by the Examiner, are of record in the patented file of this patent or the original patent.

UNITED STATES PATENTS

| | | | |
|---|---|---|---|
| 1,861,003 | 5/1932 | Foster | 161—63 XR |
| 2,056,406 | 10/1936 | Mayne | 117—42 |
| 2,132,399 | 10/1938 | Cooper | 161—88 XR |

FOREIGN PATENTS

| | | |
|---|---|---|
| 428,211 | 5/1935 | Great Britain. |
| 1,134,599 | 12/1956 | France. |

EARL M. BERGERT, *Primary Examiner.*

H. F. EPSTEIN, *Assistant Examiner.*